(No Model.)
J. A. MUNDY.
BICYCLE.
No. 541,774. Patented June 25, 1895.
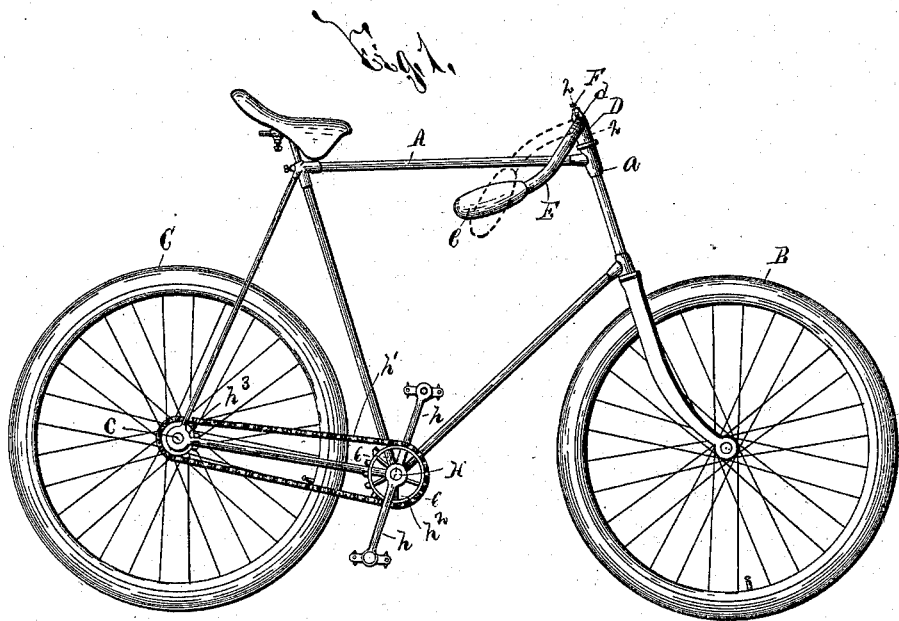
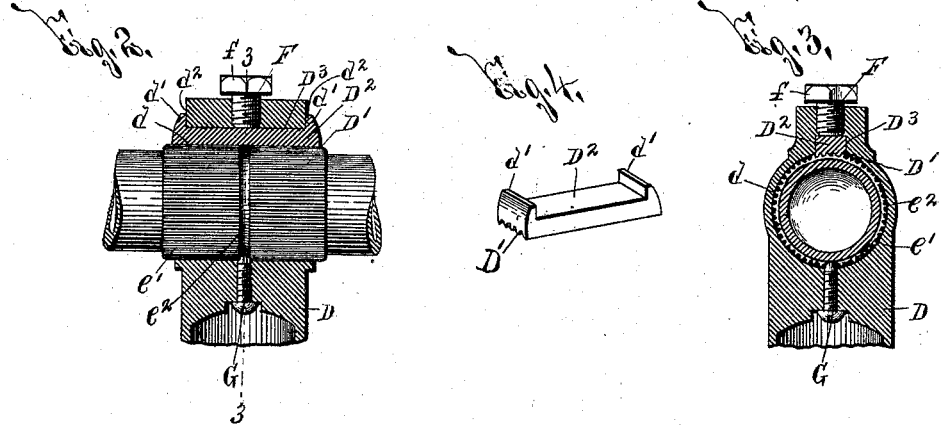
WITNESSES:
INVENTOR
John A. Mundy
BY
Wilkinson & Parsons
ATTORNEYS.

UNITED STATES PATENT OFFICE.

JOHN A. MUNDY, OF SYRACUSE, NEW YORK, ASSIGNOR TO THE SYRACUSE CYCLE COMPANY, OF SAME PLACE.

BICYCLE.

SPECIFICATION forming part of Letters Patent No. 541,774, dated June 25, 1895.

Application filed April 10, 1894. Serial No. 507,044. (No model.)

*To all whom it may concern:*

Be it known that I, JOHN A. MUNDY, of Syracuse, in the county of Onondaga, in the State of New York, have invented new and useful Improvements in Bicycles, of which the following, taken in connection with the accompanying drawings, is a full, clear, and exact description.

My invention relates to improvements in velocipedes and has for its object the production of a simple and practical device which permits ready adjustment of the handle bar and firmly holds the same in its adjusted position, is attractive in appearance, simple in construction and efficient in operation, and, to this end it consists essentially in the general construction and arrangement of the parts of the handle bar and its standard, all as hereinafter more particularly described and pointed out in the claim.

In describing this invention, reference is had to the accompanying drawings, forming a part of this specification, in which like letters indicate corresponding parts in all the views.

Figure 1 is an elevation of a bicycle provided with my invention, the handle bar being shown in one position by full lines and in its inverted position by dotted lines. Fig. 2 is an enlarged vertical section taken on line 2 2, Fig. 1. Fig. 3 is a vertical section taken on line 3 3, Fig. 2; and Fig. 4 is an isometric view of the detached engaging piece.

A is the frame of a bicycle provided with my invention and B C are wheels for supporting the frame.

D is a handle bar standard supported in any desired manner by the frame A, and, as here illustrated, the lower extremity of the standard D is suitably supported within a hollow head $a$ of the frame.

E is a handle bar having its opposite extremities suitably curved and provided with hand engaging pieces $e$ and its central portion passed through or journaled in a transverse centrally arranged eye or aperture $d$ formed in the upper end of the handle bar standard and provided with fixed walls. The handle bar standard is formed with the horizontal groove $D^3$ extending upward from the upper portion of the eye $d$ and out through the opposite side faces of the upper end of said standard, and a movable engaging piece $D^2$, of greater length than the eye $d$ is reciprocally movable in said groove in a substantially vertical plane and is provided with a lower engaging face $D'$ which is preferably corrugated or roughened. The opposite ends of the engaging piece $D^2$ are provided with upwardly extending stop shoulders $d'$ which bear against the opposite faces $d^2$ of the upper end of the standard D and prevent lengthwise movement of said engaging piece $D^2$ within the groove $D^3$.

The portion of the handle bar E arranged within the eye or aperture $d$ of the standard D is formed of slightly greater diameter than the remaining portion of said bar and is provided with a circular corrugated or roughened engaging face $e'$ which preferably projects slightly beyond the opposite ends of the eye or aperture $d$. The handle bar is rotated or rocked within the eye or aperture $d$ to its desired position as shown by full lines at Fig. 1, and the engaging piece $D^2$ is then depressed to operative position for forcing the handle bar downwardly against the lower rigid portion of the eye $d$ and firmly holding said handle bar in its adjusted position.

F is a set screw having one end movable through the upper end of the handle bar standard against the upper face of the engaging piece $D^2$ and its opposite end arranged above the upper end of the handle bar and provided with a suitable engaging portion $f$ with which a wrench or other tool is engaged.

When desired to vary the position of the handle bar or to force the same to its reverse position as seen by dotted lines at Fig. 1, the set screw F is moved upwardly and the engaging piece $D^2$ is free to rise or move within the groove $D^3$ as the handle bar is rocked or revolved within the eye or aperture $d$. To reverse the handle bar to the position shown in dotted lines, the stop G (described below) is first loosened, the engaging piece $D^2$ is then raised as above described, the bar is then rocked in the eye $d$ until the handles stand forward of the standard D, the latter is then turned for half a revolution within the head $a$, the handles adjusted to exactly the desired height, and finally the parts G and $D^2$ again set tightly in position to hold the bar as adjusted. After the desired adjustment of the handle bar E is effected, the screw F then forces the engaging piece $D^2$ into operative position and the handle bar is firmly and effectually held in its adjusted position.

Endwise movement of the handle bar within the eye or aperture $d$ is prevented by a suitable stop G which engages an annular shoulder $e^2$ of the handle bar formed by a groove in its face $e'$ The inner or lower end of the standard D is formed with an internal chamber having its upper end arranged in proximity to the lower portion of the eye $d$, and the stop G preferably consists of a longitudinally movable screw extending through the portion of the handle bar intervening between said eye and chamber and having one end projecting within the eye $d$ and into the groove in the face $e'$ for engaging the shoulder $e^2$, and its other end projecting within said internal chamber and arranged in proximity to the upper face thereof.

When it is desired to withdraw the engaging piece $D^2$ as for cleaning or repair, the screw G is first loosened and the handle bar slipped longitudinally through the eye $d$ until its roughened or corrugated part $e'$ of larger diameter has been passed out of the eye and its smooth part or body of smaller diameter stands within the eye. This smooth body is then dropped against the lower side of the eye and the lower face of the engaging piece $D^2$ dropped upon the upper side of the body of the handle bar. As the total diameter of the smooth part is as much less than that of the corrugated part $e'$ as the height of the stop-shoulders $d'$ above the upper face of the engaging piece $D^2$, it will be seen that when the handle bar is thus dropped as low as possible within the eye $d$, the engaging piece $D^2$ will be permitted to drop sufficiently to allow either of its shoulders $d'$ to pass into, along through, and out of the groove $D^3$ in the upper side of the eye. In fact, as all closely connected parts are either integral or firmly brazed together, this is the only way in which the engaging piece $D^2$ can be put in place or removed. It is therefore apparent that, even if the screw F should become loose as while riding on a rough road, and the engaging piece $D^2$ should be permitted to rise sufficiently in the groove to allow the handle bar to partially revolve within the eye; said bar could not move longitudinally in such eye by reason of the fact that the tip of the screw G engages the groove $e^2$, and hence the enlarged roughened part $e'$ is still held in the eye $d$, and the engaging piece $D^2$—although loose—cannot possibly get out of place and become lost. The handle bar may rock in its eye at this time, but a skillful rider, without dismounting, could still use it until he came to a convenient place to tighten the parts; or might even tighten them with his wrench without dismounting. On the other hand, if the clamp at the upper side of the eye remains tight, and it is the screw G which becomes loose, it will be obvious that the handle bar cannot rock in the eye, and it will also be obvious that the close contact of the engaging piece $D^2$ with the upper side of the corrugated part $e'$ will prevent a longitudinal movement of the handle bar.

It will be clear to a person skilled in the art that the same jar, vibration, or motion which loosens one screw, as F, will not loosen the other screw as G; and hence it is exceedingly unlikely that both of these screws will ever become loose at the same time. Thus, while the two screws apparently serve independent functions (that lettered F preventing rotation, and that lettered G preventing longitudinal movement) it is clear that the uppermost screw alone would prevent both movements, that the lowermost screw would prevent one movement, and that as long as both screws remain in operative position, both movements of the handle bar are most positively prevented.

The operation of my invention will be readily perceived upon reference to the foregoing description and the accompanying drawings, and it will be particularly noted that no part of my invention projects from the handle bar standard beneath the handle bar and limits the downward movement of said standard, that the upper end of the set screw which permits adjustment of the handle bar is readily engaged for effecting the desired movement thereof, and that the handle bar is firmly held in its adjusted position.

I am aware that other handle bar standards have been provided with eyes for the handle bar arranged at one side of the longitudinal center of the standard, that similar standards have been formed with projecting ears engaged by clamps for securing the handle bar thereto, that spring actuated bolts have been arranged in standards beneath the handle bars for engaging said bars, and that standards have been provided with devices projecting therefrom beneath the handle bars for effecting adjustment of the handle bars, but I do not herein claim such construction.

Having thus fully described my invention, what I claim as new, and desire to secure by Letters Patent, is—

In a velocipede, the combination with a handle bar standard having its upper end provided with a transverse cylindrical eye formed with fixed walls, a groove extending upward from the upper portion of the eye and through the opposite side faces of said upper end of the standard, and an internal chamber below said eye; of a handle bar formed at its center with a circular part $e$ larger in diameter than the body of the bar and having a corrugated surface journaled in said eye and provided with an annular groove, an engaging piece reciprocally movable in the groove toward said corrugated surface, upwardly projecting shoulders at the opposite ends of the engaging piece less in vertical length than the difference between the diameters of the corrugated part and the body of the handle bar, a set screw through the upper end of the standard and its lower end movable against said engaging piece, and a longitudinally movable stop-screw extending upward through the portion of the handle bar intervening between said eye and chamber and having one end projecting within the eye and into the groove in the handle bar and its other end projecting within said chamber, substantially as and for the purpose specified.

In testimony whereof I have hereunto signed my name, in the presence of two attesting witnesses, at Syracuse, in the county of Onondaga, in the State of New York, this 29th day of March, 1894.

JOHN A. MUNDY.

Witnesses:
CLARK H. NORTON,
E. D. WEISBURG.